(12) United States Patent
Dussud

(10) Patent No.: US 6,622,226 B1
(45) Date of Patent: Sep. 16, 2003

(54) METHOD AND SYSTEM FOR USING A MARK-LIST FOR GARBAGE COLLECTION

(75) Inventor: Patrick H. Dussud, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 09/628,879

(22) Filed: Jul. 31, 2000

(51) Int. Cl.[7] .............................................. G06F 12/00
(52) U.S. Cl. ........................ 711/159; 711/170; 707/206
(58) Field of Search ............................... 711/159, 170, 711/171; 707/206

(56) References Cited

U.S. PATENT DOCUMENTS

| | | | |
|---|---|---|---|
| 5,842,016 A | 11/1998 | Toutonghi et al. | 709/106 |
| 6,055,612 A | 4/2000 | Spertus et al. | 711/165 |
| 6,065,020 A | 5/2000 | Dussud | 707/206 |
| 6,304,949 B1 * | 10/2001 | Houlsdworth | 711/170 |

OTHER PUBLICATIONS

Courtemanche, A.J., "MultiTrash, a Parallel Garbage Collector for MultiScheme", pp. 1–47 (Jan. 27, 1986).

Jones, R. et al., "Garbage Collection Algorithms for Automatic Dynamic Memory Management", pp. 184–226 (1996).

* cited by examiner

Primary Examiner—Reginald G. Bragdon
(74) Attorney, Agent, or Firm—Merchant & Gould P.C.

(57) ABSTRACT

A method of reclaiming unused memory objects in a computing system includes traversing memory objects referenced by a program; marking the memory objects reached; adding the memory objects reached to a mark-list; detecting if the mark-list if full; and if the mark-list is full, sweeping the memory objects, and reclaiming the memory objects not marked. A system for reclaiming unused memory objects in a computing system includes a traverse module, a mark module, a record module, a mark-list module, a sweep module, and a reclaim module. The traverse module traverses memory objected reference by a program. The mark module marks the memory objects reached. The record module adds the memory objects reached to a mark-list. The mark-list module detects if the mark-list is full. The sweep module sweeps the memory objects if the mark-list is full. And, the sweep module skips the unmarked objects if the mark-list is not full. The reclaim operation reclaims the memory objects not marked.

36 Claims, 6 Drawing Sheets

502     504     506     508     510

500

METHOD AND SYSTEM FOR USING A MARK-LIST FOR GARBAGE COLLECTION

TECHNICAL FIELD

The present invention relates to garbage collection and more particularly to reclamation of allocated memory in a computing system using a modified mark-and-sweep technique having a mark-list.

BACKGROUND

During execution of a computer program or computer application, memory is allocated to the program by the operating system to enable various operations. Once allocated, other executing processes cannot use the memory allocated to that program, i.e., memory use is exclusive. When the program has finished using a portion or object of allocated memory, it can explicitly de-allocate or release that memory. For example, the program might dispose, kill, or free the memory via a specific programming code function. Once freed, other applications or processes can use the memory. This methodology has disadvantages. One such disadvantage is that the program that releases the memory does not know whether another program has claimed that memory since it was originally allocated. Thus, the program could release memory that another program is utilizing.

In some instances, the program to which the memory was initially allocated does not release the memory, even after the program is finished using that memory. Moreover, when a program is done using a memory block or object, references to that object no longer exist. Without such a reference, that memory object cannot be reached by the application. Consequently, once the program has finished using the memory, that memory cannot be reused until it is freed by the program or reclaimed by another memory management program and then reallocated to either the initial application or process or to another application or process. Thus, allocated, yet unreachable, objects are unusable and are considered to be dead or garbage.

Typically, the processes of allocating memory objects to applications and reclaiming dead memory objects, i.e., garbage collection, are performed by a memory manager. The memory manager tracks which memory objects are currently allocated to the computer program and which objects are currently available to be allocated through a free list that keeps track of available objects. Thus, memory objects that are not on the free list are currently allocated to a computer program or application. Other memory managers do not use a free list and instead allocate memory using an increasing memory address scheme. In such a case, it becomes important to not only reclaim dead memory objects, but also compact the live objects to prevent using up all of the memory.

There are several common techniques for garbage collection. One technique is referred to as copying and relates to logically dividing the memory in half and using only one half of the memory at a time. During garbage collection, the memory manager copies all reachable objects to the other half of the memory. Following the copying of all reached objects, the memory manager adds the entire first half of memory to the free list. Consequently, the previously used memory, that contained both the reachable objects and the garbage objects, becomes free memory and therefore contains only objects that are available to be allocated. In other words, the garbage memory has been reclaimed for later use.

Another common garbage collection technique relates to the mark-and-sweep method. The mark-and-sweep technique marks all reachable objects of memory. Each memory object reachable by a program application is marked as reached by the garbage collector. The garbage collector then sweeps the entire heap to reclaim all unmarked objects of memory by adding the unmarked objects to the free list. When the sweep phase is complete, all garbage objects are now on the free list and available to be reallocated to a computer program.

In some instances, the mark-and-sweep technique might be preferred over the copying technique because it is faster than copying, since the copying of objects and updating the references takes more time than adding a garbage block to a free list. Moreover, the mark-and-sweep technique is often more efficient since it uses the whole memory, as opposed to only half, as used in the copying technique. However, in other situations, the copying technique may be preferred due to the lack of fragmentation and in instances having a relatively small number of reached memory blocks. In yet another technique, the mark-and-sweep technique is improved by adding a defragmentation or compaction step at the end of the sweep or reclamation process.

The mark-and-sweep technique has disadvantages. One such disadvantage is that the sweep function of the mark-and-sweep technique examines every single memory block. This is time consuming if the number of reachable objects is low relative to the number of objects allocated.

SUMMARY

In accordance with the present invention, the above and other problems are solved by the following:

In one aspect of the present invention, a method of reclaiming unused memory objects in a computing system is provided. The method includes traversing memory objects referenced by a program; marking the memory objects reached; adding the memory objects reached to a mark-list; detecting if the mark-list if full; and if the mark-list is not full, avoiding traversing the unmarked memory objects during the sweeping of the memory objects, and reclaiming the memory objects not marked.

In another aspect of the present invention, a computer program product readable by a computing system and encoding instructions for a computer process for reclaiming unused memory objects is provided. The computer process comprises instructions analogous to that described above.

In another aspect of the present invention, a system for reclaiming unused memory objects in a computing system is provided. The system includes a traverse module, a mark module, a record module, a mark-list module, a sweep module, and a reclaim module. The traverse module traverses memory objected reference by a program. The mark module marks the memory objects reached. The record module adds the memory objects reached to a mark-list. The mark-list module detects if the mark-list is full, and, if the mark-list is not full, avoiding traversing through unmarked memory objects during the sweeping of the memory objects and reclaiming the memory objects not marked.

The invention may be implemented as a computer process, a computing system, or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its scope may be obtained from the accompanying drawings, that are briefly described below, from the following detailed descriptions of presently preferred embodiments of the invention and from the appended claims.

BRIEF DESCRIPTION OF THE DRAWINGS

Referring now to the drawings in which like reference numbers represent corresponding parts throughout.

DETAILED DESCRIPTION

In the following description of preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

In general, the present disclosure describes methods and systems for garbage collecting using a mark-list. The system traverses each memory block pointed to by the applications currently running and marks the memory blocks as "reached." The system also places the memory address of the "reached" memory blocks in a list, called a mark-list. The mark-list is of a predetermined length, chosen relative to the size of the memory. The mark-list should be large enough to cover a number of realistic possibilities for which the number of reached objects is smaller than the size of the mark-list. If the mark-list is not filled, the system goes through the reached blocks only, skipping the unmarked memory blocks, which get reclaimed for later use. If the mark-list is filled, the system mimics the mark-and-sweep technique described above.

In this fashion, the system uses the mark-list to utilize the performance advantages of both the mark-and-sweep technique and the copying technique. The mark-list technique has advantages. One such advantage is that for instances where the number of memory blocks "reached" is relatively low, the mark-list technique is quicker than the traditional mark-and-sweep technique because it skips the unmarked memory objects-, exploring only the marked memory blocks instead of every memory block.

Figure 1:
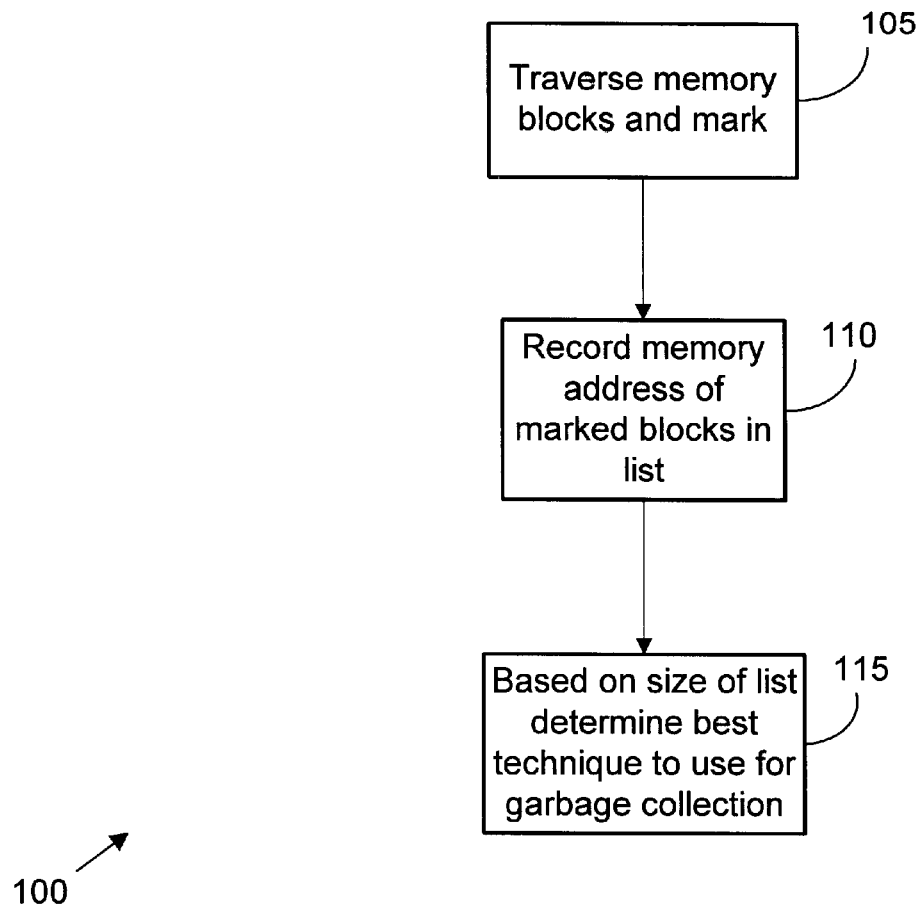
FIG. 1 is a schematic representation of methods and systems for garbage collection, according to an example embodiment of the present invention.

Referring now to FIG. 1, a schematic representation of a mark-list system 100 is illustrated. During garbage collection, a mark module 105 traverses all of the memory blocks referenced by applications currently running. The mark module 105 marks each memory block reached. A list module 110 records the memory address of the memory blocks reached in a mark-list. The mark-list is of a predetermined length, determined based on the size of the memory and memory usage. In this fashion, the memory blocks are traversed, marked as reached, and recorded in the mark-list.

A size module 115 monitors the mark-list. If the mark-list, of a predetermined size, never gets full, at the completion of marking all of the memory blocks that are reachable, the size module 115 skips the unmarked memory objects during the sweep phase. However, if the mark-list fills, the sweep phase of the mark-and-sweep technique described above is performed. In other words, the mark-list system 100 utilizes the performance advantages of both the mark-and-sweep technique and the copying technique.

Figure 2:
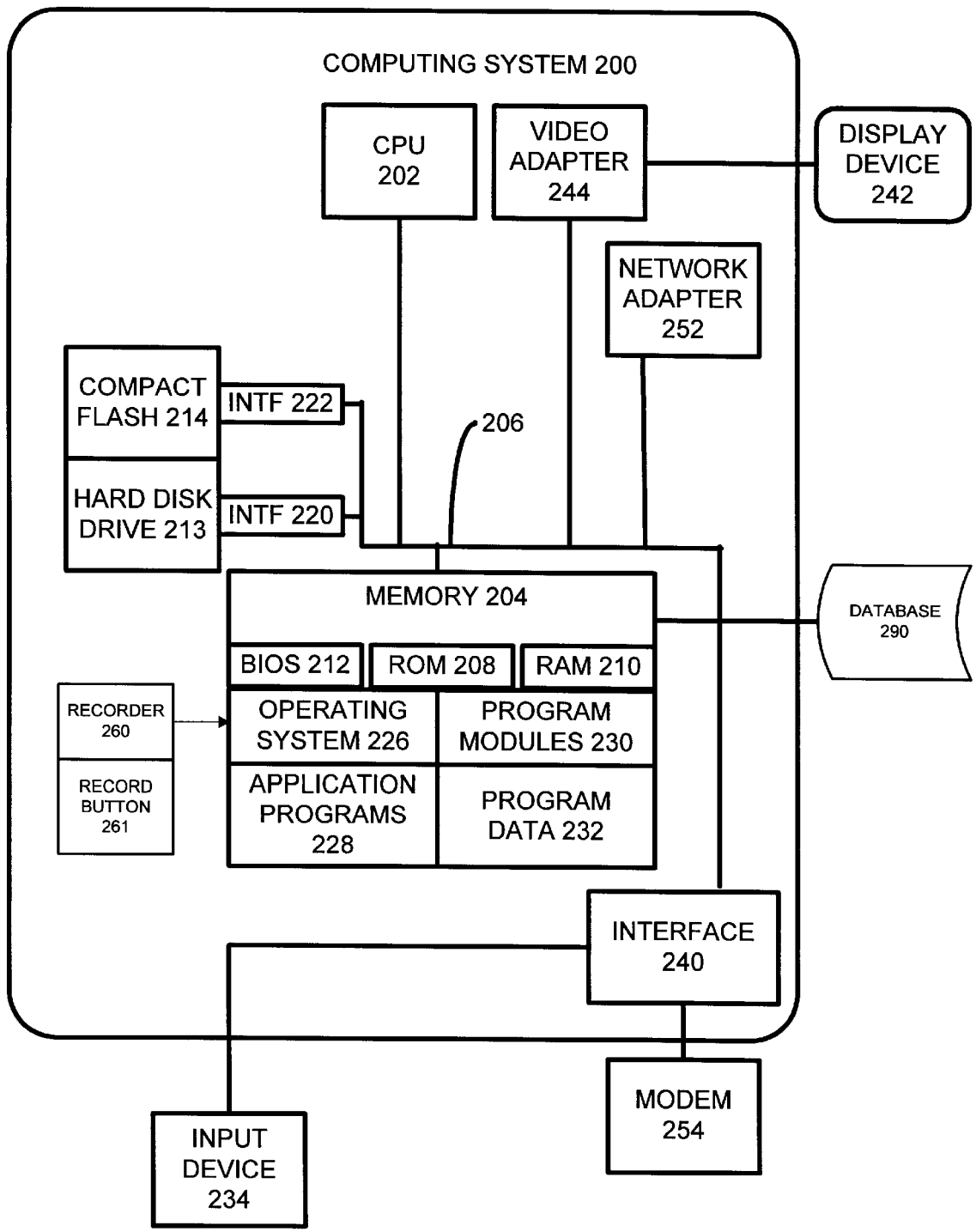
FIG. 2 is a schematic representation of a computing system that may be used to implement aspects of the present invention.

FIG. 2 and the following discussion are intended to provide a brief, general description of a suitable computing environment in which the invention might be implemented. Although not required, the invention is described in the general context of computer-executable instructions, such as program modules, being executed by a computing system. Generally, program modules include routines, programs, objects, components, data structures, etc. that perform particular tasks or implement particular abstract data types.

Those skilled in the art will appreciate that the invention might be practiced with other computer system configurations, including handheld devices, palm devices, multiprocessor systems, microprocessor-based or programmable consumer electronics, network personal computers, minicomputers, mainframe computers, and the like. The invention might also be practiced in distributed computing environments where tasks are performed by remote processing devices that are linked through a communications network. In a distributed computing environment, program modules might be located in both local and remote memory storage devices.

Referring now to FIG. 2, an exemplary environment for implementing embodiments of the present invention includes a general purpose computing device in the form of a computing system 200, including at least one processing system 202. A variety of processing units are available from a variety of manufacturers, for example, INTEL® or ADVANCED MICRO DEVICES®. The computing system 200 also includes a system memory 204, and a system bus 206 that couples various system components including the system memory 204 to the processing unit 202. The system bus 206 might be any of several types of bus structures including a memory bus, or memory controller; a peripheral bus; and a local bus using any of a variety of bus architectures.

Preferably, the system memory 204 includes read only memory (ROM) 208 and random access memory (RAM) 210. A basic input/output system 212 (BIOS), containing the basic routines that help transfer information between elements within the computing system 200, such as during start-up, is typically stored in the ROM 208.

Preferably, the computing system 200 further includes a secondary storage device 213, such as a hard disk drive, for reading from and writing to a hard disk (not shown), and a compact flash card 214.

The hard disk drive 213 and compact flash card 214 are connected to the system bus 206 by a hard disk drive interface 220 and a compact flash card interface 222, respectively. The drives and cards and their associated computer-readable media provide nonvolatile storage of computer readable instructions, data structures, program modules and other data for the computing system 200.

Although the exemplary environment described herein employs a hard disk drive 213 and a compact flash card 214, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 213, compact flash card 214, ROM 208, or RAM 210, including an operating system 226, one or more application programs 228, other program modules 230, and program data 232. A user may enter commands and information into the computing system 200 through an input device 234. Examples of input devices might include a keyboard, mouse, microphone, joystick, game pad, satellite dish, scanner, and a telephone. These and other input devices are often connected to the processing unit 202 through an interface 240 that is coupled to the system bus 206. These input devices also might be connected by any number of interfaces, such as a parallel port, serial port, game port, or a universal serial bus (USB). A display device 242, such as a monitor, is also connected to the system bus 206 via an interface, such as a video adapter 244. The display device 242 might be internal or external. In addition to the display device 242, computing systems, in general, typically include other peripheral devices (not shown), such as speakers, printers, and palm devices.

When used in a LAN networking environment, the computing system 200 is connected to the local network through a network interface or adapter 252. When used in a WAN networking environment, such as the Internet, the computing system 200 typically includes a modem 254 or other means, such as a direct connection, for establishing communications over the wide area network. The modem 254, which can be internal or external, is connected to the system bus 206 via the interface 240. In a networked environment, program modules depicted relative to the computing system 200, or portions thereof, may be stored in a remote memory storage device. It will be appreciated that the network connections shown are exemplary and other means of establishing a communications link between the computing systems may be used.

The computing system 200 might also include a recorder 260 connected to the memory 204. The recorder 260 includes a microphone for receiving sound input and is in communication with the memory 204 for buffering and storing the sound input. Preferably, the recorder 260 also includes a record button 261 for activating the microphone and communicating the sound input to the memory 204.

A computing device, such as computing system 200, typically includes at least some form of computer-readable media. Computer readable media can be any available media that can be accessed by the computing system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
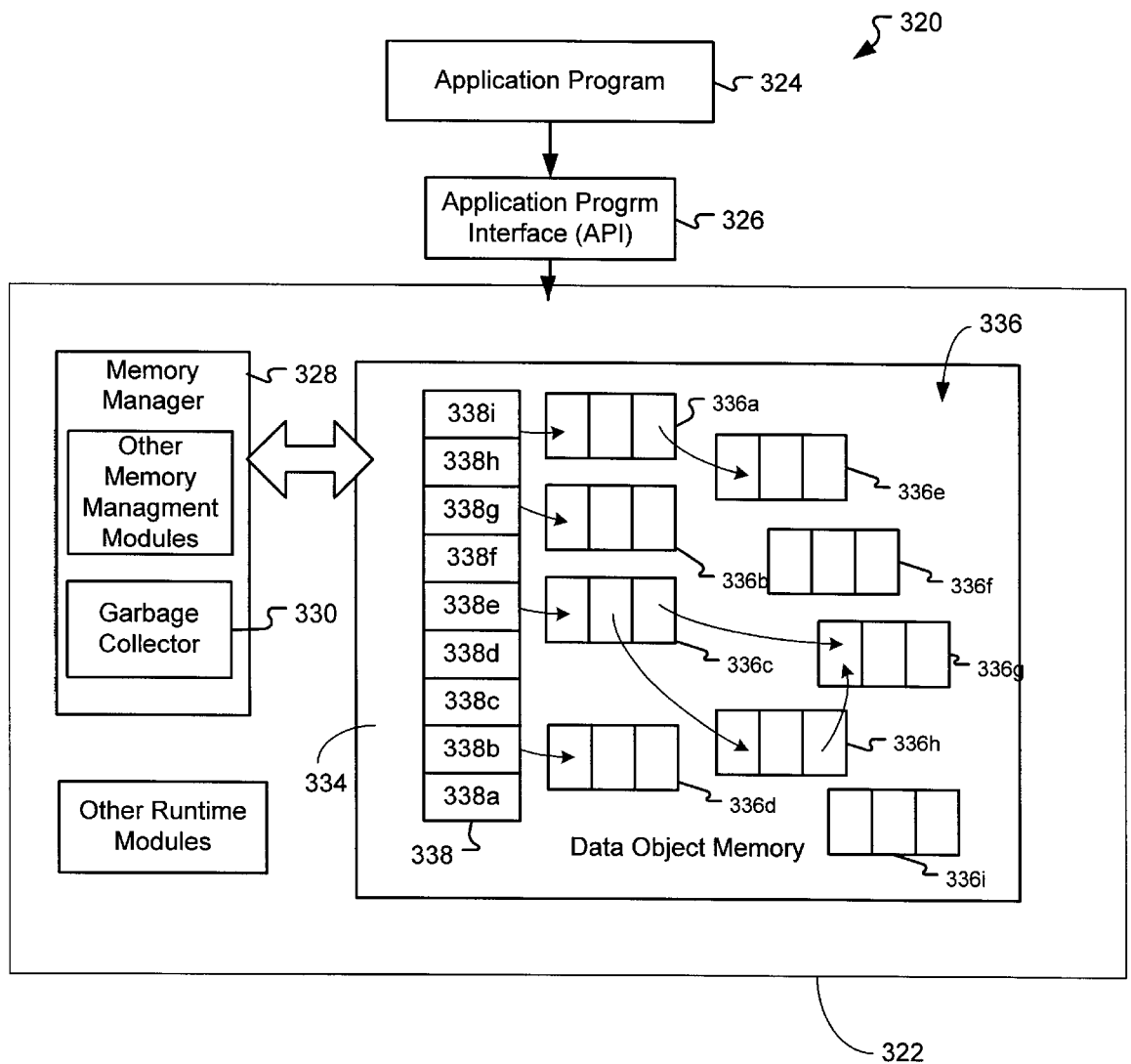
FIG. 3 is a schematic representation of a system architecture that may be used to implement aspects of the present invention.

Referring now to FIG. 3, an exemplary software environment for implementing aspects of the present invention includes a garbage collection system 320. The garbage collection system 320 has a runtime environment 322 that operates to execute application programs and processes, such as an application program 324. The application program 324 might directly communicate with the runtime environment 322 or communicate through an application program interface, such as an application program interface 326 illustrated in FIG. 3.

Preferably, the runtime environment 322 incorporates a memory manager 328 having a garbage collector module 330. In alternative embodiments, the garbage collector might not be in the memory manager, and might even be a separate application program apart from the runtime environment. The runtime environment 322 also incorporates a memory portion 334, which is the portion of memory that maintains allocated memory objects such as memory objects, or blocks, 336 for the application program 324, or programs. The connection of the various memory objects 336 is often referred to as a "graph." In addition to the memory objects 336, the memory portion 334 also maintains a stack 338 of root references 338a, 338b, 338c, 338d, 338e, 338f, 338g, 338h, and 338i. The root references 338a, 338b, 338c, 338d, 338e, 338f, 338g, 338h, and 338i are storage locations that are always deemed to be live, i.e. not garbage. The stack 338 typically contains object reference information that references memory objects 336a, 336b, 336c, and 336d where object reference information is essentially a variable that contains the memory location, or address, of some data rather than the data itself.

The memory objects 336, in turn, might have object reference information that references other memory objects. For example, in FIG. 3, memory object 336a references object 336e, and memory object 336c references both memory objects 336g and 336h. In some instances, the memory objects 336 might not have information referencing other memory objects, such as memory object 336d, which does not reference any other memory object 336. Additionally, some memory objects 336, such as memory object 336f, might exist that were previously referenced by either a root reference or another memory object but are no longer referenced by either.

The memory objects, such as memory objects 336a, 336b, 336c, 336d, 336e, 336g, and 336h are all referenced by another memory object or root, and are therefore considered to live and referenced. On the other hand, memory objects 336f, 336i are not referenced by another memory object or root and therefore are considered to be garbage, i.e., space no longer required by the computing system but that has not yet been reclaimed by the garbage collector 330.

The memory manager 328 determines, based on predetermined thresholds, when to perform garbage collection. A common predetermined threshold is based on the number of allocated objects or objects of memory. That is, the memory manager 328 maintains a running total of the number of allocated objects and once the number of objects exceeds a predetermined threshold number, the memory manager 328 initiates garbage collection. Following the garbage collection, the running total of allocated objects is reduced by the number of reclaimed objects in memory. Once the running total exceeds the predetermined threshold again, the memory manager 328 simply reinitiates the garbage collection process.

Using the mark-and-sweep technique, the garbage collector 330 traverses the memory objects referenced by a currently running application program, such as the application program 324. The garbage collector 330 begins with the stack 338 of root references. The live memory objects 336a, 336b, 336c, 336d, 336e, 336g, and 336h are marked as reachable. During the sweep phase, each memory block 336a, 336b, 336c, 336d, 336e, 336f, 336g, and 336h is traversed. The unmarked memory blocks 336f and 336i are reclaimed by the garbage collector for later use.

Using the copying technique, the garbage collector 330 creates a duplicate memory portion (not shown). The garbage collector 330 traverses the memory objects referenced by a currently running application program, such as the application program 324. The garbage collector 330 then copies any reached memory blocks to the new duplicate memory portion. The garbage collector 330 begins with the stack 338 of root references. The live memory objects 336a, 336b, 336c, 336d, 336e, 336g, and 336h are copied to the new duplicate memory portion. The entire old memory portion 334 is then reclaimed for later use. Thus, the live memory objects 336a, 336b, 336c, 336d, 336e, 336g, and 336h remain in the new memory portion of use, while the dead objects 336f and 336i are reclaimed.

In alternative embodiments, the garbage collector operates only on portions of the memory at a time. In such a case, the memory might be divided into segments, where a given portion of the most recently allocated memory objects makes up an "ephemeral" portion. The garbage collector might operate solely on the ephemeral portion, or it might operation on different portions at different times. In other words, the garbage collector can operate on the entire memory space or a subset thereof.

The copying technique is advantageous in instances where the number of live memory objects is relatively low compared with the overall memory, because only the live memory objects are traversed rather than all of them. However, where the number of live memory objects is relatively high compared with the overall memory, the mark-and-sweep technique is advantageous, because the mark-and-sweep technique does not need to create a new duplicate memory portion. Thus, more of the computing systems memory can be utilized.

In general, the present invention utilizes portions of both techniques by use of a mark-list, taking advantage of portions of the copying technique when the number of live memory objects is relatively low compared with the overall memory, and using the mark-and-sweep technique in other instances.

Figure 4:
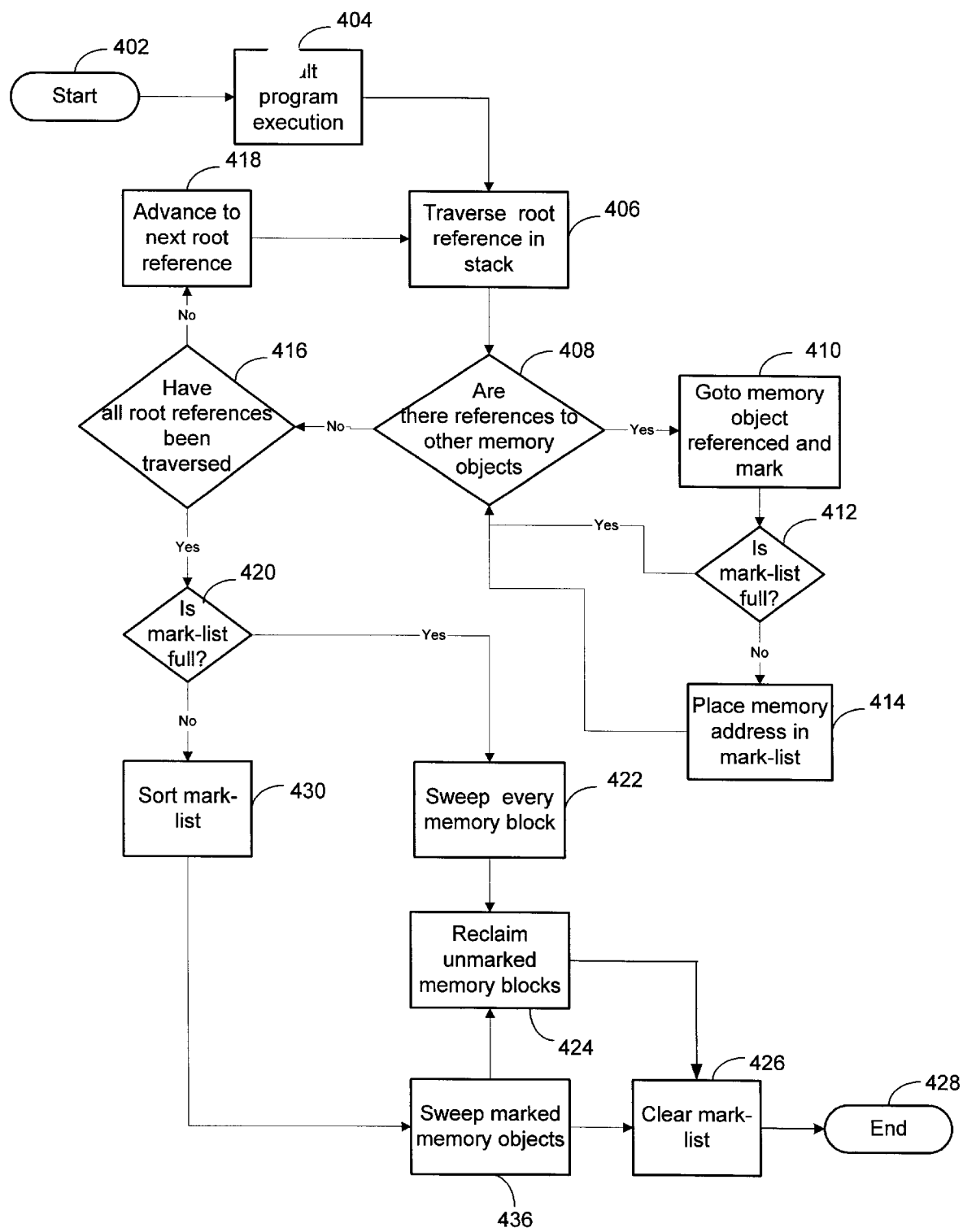
FIG. 4 is a flow chart illustrating the logical operations of the methods and systems of FIG. 1.

FIG. 4 is a flow chart representing logical operations of a garbage collection system 400 for reclaiming unused portions of memory. Entrance to the operational flow of the garbage collection system 400 begins at a flow connection 402. A halt operation 404 stops execution on the computing system, such as the computing system 200 of FIG. 2 for all programs or applications, such as application program 324 of FIG. 3, that are currently running. The execution of these programs and applications are halted because the programs or application might modify the memory in some unexpected manner. For example, a currently running program could add a reference if allowed to continue to run. The garbage collection system 400 would reclaim that memory block because the system would not be able to detect the new reference. Therefore, the execution of all the programs and applications is halted during garbage collection.

A traverse operation 406 traverses the root references in the stack, such as the stack 338 of FIG. 3. The traverse operation 406 begins with the first root reference, such as root reference 338a of FIG. 3. A reference module 408 detects if there are other references to other memory objects. For example, a root reference might refer to another memory block. The reference module 408 detects this reference. If the reference module 408 detects a reference to another memory block, operational flow branches "YES" to a mark operation 410. The mark operation 410 goes to the memory object referenced and marks the memory object as "reached." In other words, the mark operation 410 flips a bit associated with the memory object indicating the memory object is live or in use.

A mark-list module 412 detects if a mark-list is full. If the mark-list module 412 detects that the mark-list is not full, operational flow branches "NO" to a record operation 414. The record-operation 414 places the memory address of the reached memory object, reached by the mark operation 410, in the mark-list. Thus, the mark-list stores all of the memory addresses reached during the mark phase of the garbage collection system 400. The mark-list is a list of memory addresses stored in the memory of the computing system. Operational flow proceeds to the reference module 408.

Referring back to the mark-list module 412, if the mark-list module 412 detects that the mark-list is full, operational flow branches "YES" to the reference module 408. Thus, if the mark-list is full, there is no need to place additional memory addresses in the mark-list as will be explained in more detail below.

Referring to the reference module 408, if the reference module 408 detects that there are not any other references to other memory objects, operational flow branches "NO" to a root module 416. The reference module 408 allows the garbage collection system 400 to traverse all of the memory blocks in a chain of references from a root reference. In other words, the reference module 408 allows the garbage collection system 400 to recursively examine memory blocks referenced from the root reference or from another memory block referenced by a root reference.

The root module 416 detects if all the root references have been traversed. If the root module 416 detects that not all of the root references have been traversed, operational flow branches "NO" to an advance operation 418. The advance operation 418 advances the system 400 to the next root reference, such as root reference 338b of FIG. 3. Thus, the root module 416 allows the garbage collection system 400 to traverse all of the root references in the stack. The root module 416 ensures that all of the root references are examined, and the reference module 414 ensures that all of the memory objects referenced in a chain from the stack are examined. In this fashion, the garbage collection system 400 recursively examines and marks all live memory objects in the memory.

Referring to the root module 416, if the root module 416 detects that all of the root references have been examined, and therefore all of the live memory objects have been examined and marked, operational flow branches YES" to a mark-list module 420. The mark-list module 420 detects if the mark-list is full. If the mark-list module 420 detects that the mark-list is full, operational flow branches "YES" to a sweep operation 422. The sweep operation 422 sweeps all of the memory objects, live and dead, in the memory of the computing system. A reclaim operation 424 reclaims the unmarked memory objects for later use by the computing system. Thus, if the mark-list is full, the garbage collection system 400 behaves analogously to the mark-and-sweep technique previously described with the exception of filling the mark-list.

The mark-list is of a predetermined size, for example, 400. That is the mark-list contains a predetermined number of memory address space allocations. The size of the mark-list is determined based on the total size of the memory in the computing system. In very large computing systems, such as servers, the size of the mark-list might be in the thousands. Of course, any size of mark-list could be used. The size of the mark-list is determined based on efficiency. If the number of live memory objects is relatively large, the sweep function of the mark-and-sweep technique is advantageous. If the number of live memory objects is relatively small, skipping the unmarked memory objects is advantageous. Therefore, the mark-list allows the garbage collection 400 system to optimize the garbage collection process, using the sweep function when the number of live memory objects is relatively large, and skipping the unmarked memory objects, explained in more detail below, when the number of live memory objects is relatively small.

A clear operation 426 clears the mark-list of the memory addresses recorded therein. Thus, the mark-list will be empty upon executing the garbage collection system 400 and ready for the next garbage collection event. Operational flow ends at flow connection point 428.

Referring again to the mark-list module 420, if the mark-list module 420 detects that the mark-list is not full, operational flow branches "NO" to a sort operation 430. The sort operation 430 sorts the mark-list. The mark-list is sorted because it is more efficient to move from left to right in the memory of the computing system. -A sweep operation 436 sweeps only the marked memory objects, skipping the unmarked memory objects, going only from objects to objects that have been entered into the mark-list. The space between the marked objects, composed of one or more unmarked objects, is reclaimed as one block by the reclaim operation 424. Operational flow proceeds as previously desdribed.

Figure 5:
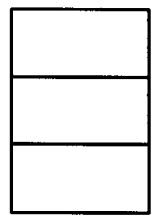
FIG. 5 is a schematic representation of a mark-list according to a first embodiment of the present invention.
Figure 5:
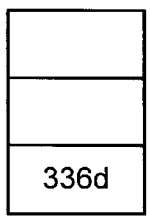
Figure 5:
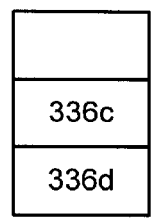
Figure 5:
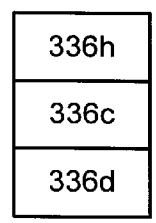
Figure 5:
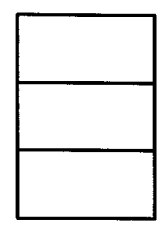
Figure 5:

The operational flow chart depicted in FIG. 4 may best be understood in terms of application examples. Referring to FIGS. 3, 4, and 5 in a first application example, the memory space 334 of FIG. 3 is parsed by the garbage collection system 400 of FIG. 4 in space allocations. The memory manager 328 typically initiates the garbage collection system 400 once a predetermined number of memory objects have been allocated. In other embodiments, another module initiates the garbage collection system 400, such as the garbage collector 330 or the runtime environment 322, among others.

FIG. 5 is a schematic representation of a mark-list 500 having three memory address space allocations for this application example. Operational flow begins at 402. The halt operation 404 halts the application program 324 currently running on the computing system. The traverse operation 406 begins with the first root reference 338a in the stack 338. The reference module 408 detects that there are not any references to other memory objects, and operational flow branches "NO" to the root module 416.

The root module 416 detects that not all of the root references have been traversed, and operational flow branches "NO" to the advance operation 418. The advance operation 418 advances the system 400 to the next root reference 338b. The traverse operation 406 traverses the next root reference 338b. The reference module 408 detects that there are references to other memory objects, i.e., memory object 336d, and operational flow branches "YES" to the mark operation 410. The mark operation 410 goes to the memory object 336d and marks the memory object 336d as reached, or flips the bit associated with that memory object 336d. The mark-list module 412 detects that the mark-list is not full, represented as mark-list 502, and operational flow branches "NO" to the record operation 414. The record operation 414 records the memory address for memory object 336d in the mark-list, represented as mark-list 504.

The reference module 408 detects that there are no references to other memory objects, and operational flow branches "NO" to the root module 416. Operational flow proceeds as previously described until root reference 338e is reached. The reference module 408 detects that root reference 338e has references to other memory objects, i.e., memory object 336c. The mark operation 410 goes to memory object 336c and marks memory object 336c as reached. The mark-list module 412 detects that the mark-list 504 is not full, and operational flow branches to the record operation 414. The record operation 414 records the memory object 336c in the mark-list, represented as mark-list 506.

The reference module 408 detects that there are references to other memory blocks, and operational flow branches "YES" to the mark operation 410. Operational flow proceeds as previously described, and the record operation 414 records the memory address for memory object 336h in the mark-list, represented as mark-list 508. Operational flow proceeds as previously described. When examining memory object 336g, the mark-list module 412 detects that the mark-list is full, and operational flow branches to reference module 408.

Operational flow proceeds as previously described. After root reference 338i and its other memory references are examined, the root module 416 detects that there are not any other root references, and operational flow branches "YES" to the mark-list module 420. The mark-list module 420 detects that the mark-list 508 is full, and operational flow branches "YES" to the sweep operation 422. The sweep operation 422 sweeps the memory space 334 and reclaims the unmarked memory objects 336i and 336f. Memory objects 336d, 336c, 336b, 336a, 336g, and 336h were marked by the garbage collection system 400 as reached, and thus, are not reclaimed. The clear operation 426 clears the mark-list, represented as mark-list 510, for later use.

Figure 6:
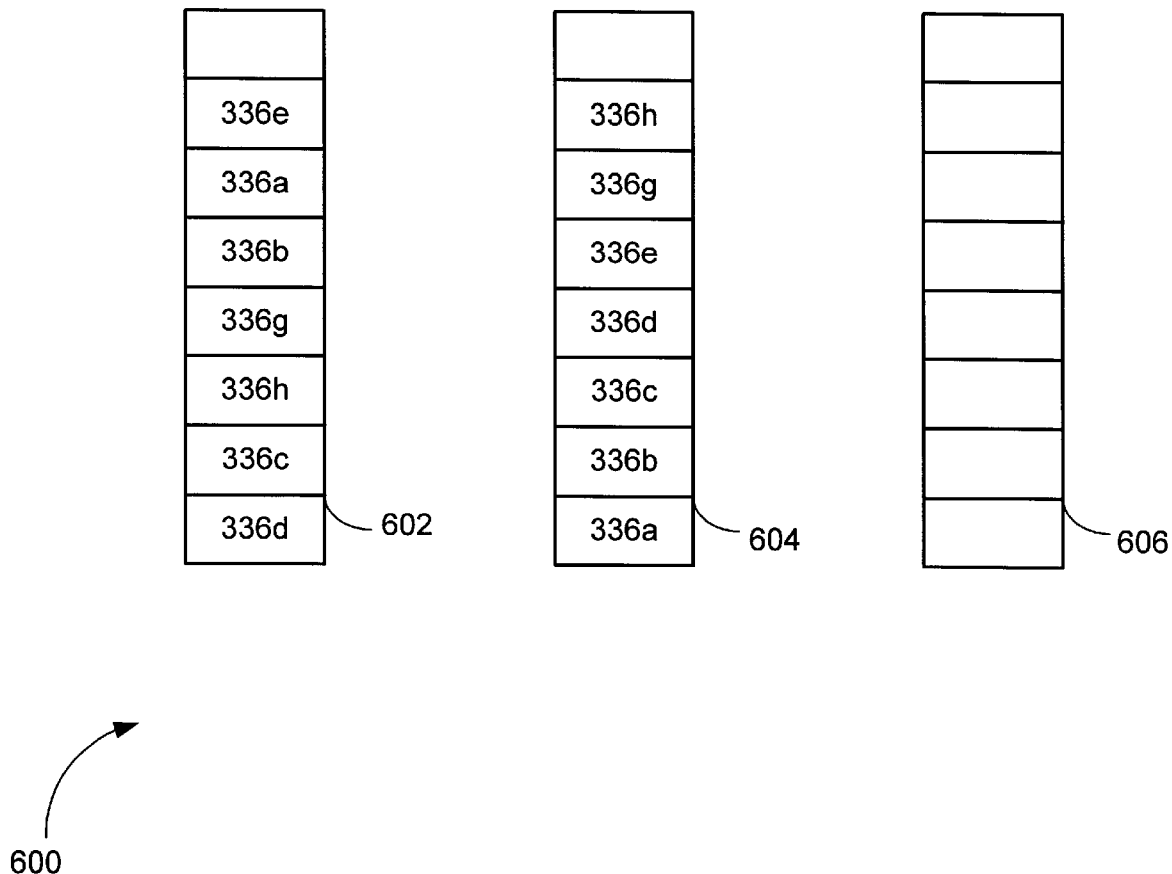
FIG. 6 is a schematic representation of a mark-list according to a second embodiment of the present invention.

Referring to FIGS. 3, 4, and 6, FIG. 6 is a schematic representation of a mark-list 600 with a size of eight memory address spaces allocated. In a second application example, operational flow proceeds as described above, but the record operation 414 records the memory addresses for memory objects 336d, 336c, 336h, 336g, 336b, 336a, and 336e in the mark-list, represented as mark-list 602 in FIG. 6. In other words, the mark-list module 412 does not detect that the mark-list 600 is full in this application example, so operational flow proceeds through the record operation 414 for each memory object traversed.

Referring to the mark-list module 420, the mark-list module 420 detects that the mark-list 602 is not full, and operational flow proceeds to the sort operation 430. The sort operation 430 sorts the mark-list 602, resulting in mark-list 604. The sweep operation 436 skips the unmarked memory objects, going only from objects to objects that have been intered in the mark-list. The space between the marked objects, composed of one or more unmarked objects, is reclaimed as one block by the reclaim operation 424. The clear operation 426 resets the index of the free list to the beginning of the mark-list, preparing the mark-list for the next time the garbage collection system 400 runs.

The logical operations of the various embodiments illustrated herein are implemented (1) as a sequence of computer implemented steps or program modules running on a computing system and/or (2) as interconnected logic circuits or circuit modules within the computing system. The implementation is a matter of choice dependent on the performance requirements of the computing system implementing the invention. Accordingly, the logical operations making up the embodiments of the present invention described herein are referred to variously as operations, steps, engines, or modules.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of reclaiming unused memory objects in a computing system, the method comprising:
   traversing memory objects referenced by a program;
   marking the memory objects which are reachable;
   adding the memory objects reached to a mark-list;
   detecting if the mark-list is full;
   if the mark-list is full:
      sweeping all memory objects; and
      reclaiming the memory objects not marked.

2. A method according to claim 1, further comprising:
   if the mark-list is not full:
      sorting the mark-list;
      sweeping the reached memory objects using the mark-list, skipping the unmarked objects; and
      reclaiming old memory space.

3. A method according to claim 2, further comprising:
   after reclaiming the memory objects and reclaiming the old memory space, clearing the mark-list.

4. A method according to claim 1, further comprising:
   before traversing, halting program execution.

5. A method according to claim 1, wherein:
   adding the memory objects includes detecting if a mark-list is full and if the mark-list is not full, adding the memory objects reached to the mark-list.

6. A method according to claim 1, wherein:
   traversing the memory objects includes traversing root references.

7. A method according to claim 6, wherein:
   traversing the memory objects includes traversing other memory objects referenced by the root references.

8. A method according to claim 7, wherein:
   traversing the memory objects includes traversing other memory objects referenced by other memory objects.

9. A method according to claim 1, wherein:
   traversing includes recursively traversing each memory object referenced by a program.

10. A method according to claim 1, wherein:
    traversing includes traversing only a subset of memory objects referenced by a program.

11. A method according to claim 10, wherein:
    traversing includes traversing only an ephemeral range of the memory.

12. A method according to claim 1, wherein:
    traversing the memory objects includes traversing at least one memory object.

13. A computer program product readable by a computing system and encoding instructions for a computer process for reclaiming unused memory objects in a computing system, the computer process comprising:
    traversing memory objects referenced by a program;
    marking the memory objects which are reachable;
    adding the memory objects reached to a mark-list;
    detecting if the mark-list is full;
    if the mark-list is full:
       sweeping all memory objects; and
       reclaiming the memory objects not marked.

14. A computer program product according to claim 13, further comprising:
    if the mark-list is not full:
       sorting the mark-list;
       sweeping the reached memory objects using the mark-list, skipping the unmarked objects; and
       reclaiming old memory space.

15. A computer program product according to claim 14, further comprising:
    after reclaiming the memory objects and reclaiming the old memory space, clearing the mark-list.

16. A computer program product according to claim 13, further comprising:
    before traversing, halting program execution.

17. A computer program product according to claim 13, wherein:
    adding the memory objects includes detecting if a mark-list is full and if the mark-list is not full, adding the memory objects reached to the mark-list.

18. A computer program product according to claim 13, wherein:
    traversing the memory objects includes traversing root references.

19. A computer program product according to claim 18, wherein:
    traversing the memory objects includes traversing other memory objects referenced by the root references.

20. A computer program product according to claim 19, wherein:
    traversing the memory objects includes traversing other memory objects referenced by other memory objects.

21. A computer program product according to claim 13, wherein:
    traversing includes recursively traversing each memory object referenced by a program.

22. A computer program product according to claim 13, wherein:

traversing includes traversing only a subset of memory objects referenced by a program.

23. A computer program product according to claim 22, wherein:

traversing includes traversing only an ephemeral range of the memory.

24. A computer program product according to claim 13, wherein:

traversing the memory objects includes traversing at least one memory object.

25. A system for reclaiming unused memory objects in a computing system, the system comprising:

a traverse module that traverses memory objects referenced by a program;

a mark module that marks the memory objects which are reachable;

a record module that adds the memory objects reached to a mark-list;

a first mark-list module that detects if the mark-list is full;

a sweep module that sweeps all memory objects, if the mark-list is full; and a reclaim module that reclaims the memory objects not marked.

26. A system according to claim 25, further comprising:

a sort module that sorts the mark-list if the mark-list is not full; and a second sweep module that sweeps the reached memory objects using the mark-list, skipping the unmarked objects.

27. A system according to claim 26, further comprising:

a clear module that clears the mark-list.

28. A system according to claim 25, further comprising:

a halt module that halts program execution.

29. A system according to claim 25, further comprising:

a second mark-list module that detects if the mark-list is full prior to the record module adding the memory objects reached to the mark-list.

30. A system according to claim 25, wherein:

memory objects include root references.

31. A system according to claim 30, wherein:

memory objects include other memory objects referenced by the root references.

32. A system according to claim 31, wherein:

memory objects include other memory objects referenced by other memory objects.

33. A system according to claim 25, wherein:

the traverse module recursively traverses each memory object referenced by a program.

34. A system according to claim 25, wherein:

the traverse module traverses only a subset of memory objects referenced by a program.

35. A system according to claim 34, wherein:

the traverse module traverses only an ephemeral range of the memory.

36. A system according to claim 25, wherein:

the traverse module traverses at least one memory object.

* * * * *